Nov. 23, 1971 A. A. FIORENTINO 3,621,751

MOUNTING STUD

Filed May 22, 1970

INVENTOR.
ARTHUR A. FIORENTINO

BY

ATTORNEY

United States Patent Office 3,621,751
Patented Nov. 23, 1971

3,621,751
MOUNTING STUD
Arthur A. Fiorentino, Piscataway, N.J., assignor to Thomas & Betts Corporation, Elizabeth, N.J.
Filed May 22, 1970, Ser. No. 39,729
Int. Cl. F16b 19/00
U.S. Cl. 85—5 R
11 Claims

ABSTRACT OF THE DISCLOSURE

The invention is directed to an improved unitary, self-locking, readily attachable mounting stud. Extending outwardly from a relatively flat button-like head member is a body member comprising a pair of generally resilient, spaced apart, recessed, elongated, interconnected portions adapted to receive therebetween a generally elongated member. The elongated portions are compressible inwardly normal to the longitudinal axis thereof to permit the body member to be forcibly urged through a dimensionally restrictive aperture in a panel or similar structure. A recessed portion of the body member directly adjacent the head member serves as a locking means to secure the mounting stud in position.

BACKGROUND OF THE INVENTION

Field of the invention

The invention is directed to the field of mounting devices, and principally to unitary self-locking mounting studs for insertion and retention within a dimensionally restrictive aperture in a panel or similar structure.

Description of the prior art

Mounting devices according to the prior art generally comprised in one form a pair of discrete members adapted to be threadably assembled through an aperture in a panel or mounting plate to form a support structure for the receipt of a strap or similar elongated member. Such devices were cumbersome, bulky, and relatively expensive, being susceptible to loss of one or the other of the individual components, and stripping of the threaded member. Other commonly employed mounting devices relied on adhesives in an attempt to secure the mounting device to the described structure, such devices being thereby limited in strength and subject to rapid failure under adverse environmental conditions. Additionally, such prior art devices generally required a relatively flat, clean area available for the receipt of the adhesive portion of the device, thereby seriously limiting their field of use.

SUMMARY OF THE INVENTION

The invention is directed to an improved mounting stud which overcomes the problems noted above with respect to prior art devices by providing a unitary, integral, self-locking, readily attachable mounting stud which is simpler, less expensive, and more efficient than such devices. A body member, comprising a pair of generally elongated, spaced apart, resilient portions, is coupled to and projects outwardly from a relatively flat, button-like head member. Coupling the ends of the pair of resilient portions of the body member remote from their juncture with the head member is a preferably tapered interconnecting portion providing a convenient means for initiating the entry of the body member through a dimensionally restrictive aperture in a panel or similar structure. The inner surface of each of the resilient elongated body member portions may be appropriately recessed in generally transverse relation to the longitudinal axis thereof, opposing recesses being disposed in generally complementary relationship to at least partially define a passage for the receipt therethrough of an elongated member. A section of the outer surface of each resilient body member portion adjacent the head member may be selectively recessed to provide locking shoulders serving to effectively retain the mounting stud within its associated panel aperture. It is therefore an object of this invention to provide an improved mounting stud.

It is another object of this invention to provide an improved, unitary mounting stud conveniently insertable within a dimensionally restrictive aperture in a panel or similar structure.

It is a further object of this invention to provide an improved, unitary, integral mounting stud having a pair of resiliently deflectable, recessed, interconnected extending portions adapted to receive a strap or similar elongated member therebetween.

It is still another object of this invention to provide an improved, self-locking, unitary mounting stud having an internally recessed body member providing a plurality of passages for the insertion therethrough of dimensionally selective elongated members.

Other objects and features of the invention will be pointed out in the following description and claims and illustrated in the accompanying drawings, which disclose, by way of example, the principle of the invention and the best mode which has been contemplated for carrying it out.

BRIEF DESCRIPTION OF THE DRAWINGS

In the drawings.

Similar elements are given similar reference characters in each of the respective drawings.

DESCRIPTION OF THE PREFERRED EMBODIMENTS

Figure 1:
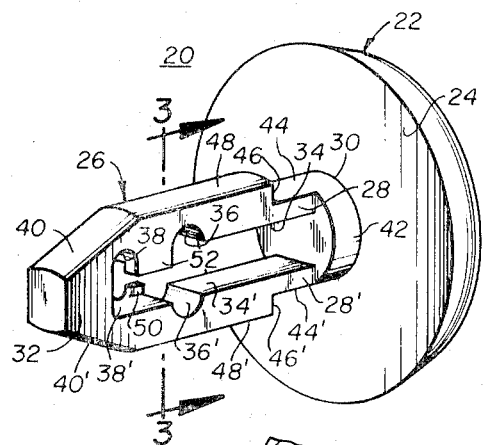
FIG. 1 is a perspective view of a mounting stud constructed in accordance with the concepts of the invention.
Figure 2:
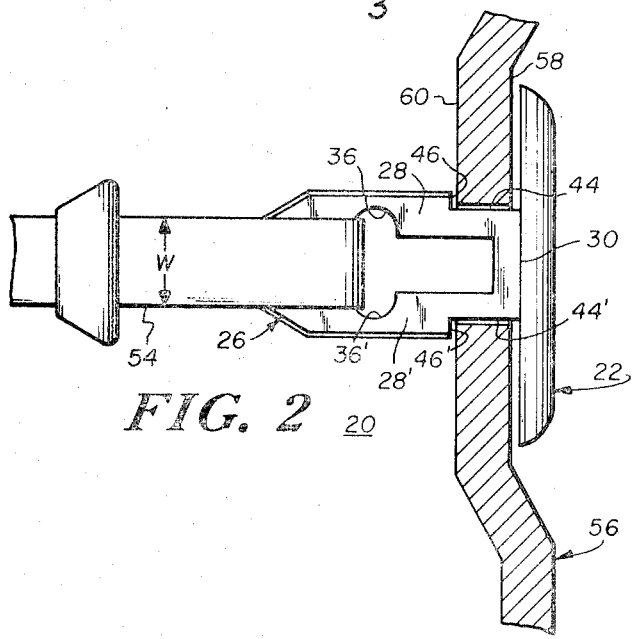
FIG. 2 is a side elevation view of the device of FIG. 1 mounted in a panel and supporting an elongated strap.
Figure 3:
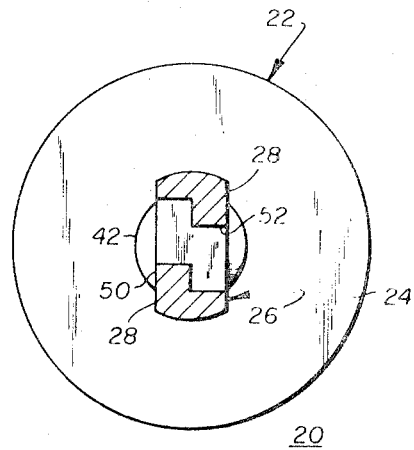
FIG. 3 is a front elevation view, partly in section, of the device of FIG. 1 taken along the lines 3—3.

Turning now to FIGS. 1, 2 and 3, there is shown an improved mounting stud 20 constructed in accordance with the concepts of the invention. Coupled to a generally circular button-like head member 22, of mounting stud 20, generally centrally of a first surface 24 of head member 22 and extending outwardly therefrom substantially normal to the plane of first surface 24, is a body member 26 comprising a pair of generally elongated, resilient, spaced apart portions 28, 28' coupled at their free ends by an interconnecting portion 32. The inner surface 34, 34' of each of the pair of elongated resilient portions 28, 28' of body member 26 has disposed therein in adjacent, substantially parallel relationship, two generally arcuate transverse recesses 36, 38 and 36', 38', positioned inter mediate the length of their associated elongated portions 28, 28'. The recessed portions 36 and 38 of one of the pair of elongated portions 28 are disposed in generally opposing complementary relation with respect to recessed portions 36' and 38' of the other of the pair of elongated portions 28', the inner walls of said pairs of recesses 36, 36' and 38, 38' thereby at least partially defining two transverse passages, the purpose of which will be more fully explained below. A portion 52 of the inner surface 34 of one of the pair of elongated body member portions 28 intermediate the recessed portions 36 and 38 thereof is partially recessed, providing an interrupted transverse separation between said recesses 36 and 38. A similar partially recessed intermediate portion 50 of the other of said pair of elongated body member portions 28' is positioned in offset opposing relationship with said portion 52, portions 50 and 52 being so arranged as to permit elongated body member portions 28, 28' to be urged together in relatively close proximate relationship, as is more clearly shown in FIG. 3. Opposing surfaces 40, 40' of interconnecting portion 32 directly adjacent elongated body member portions 28, 28' are preferably tapered to facilitate the insertion of body member 26 through a dimensionally restrictive aperture in a panel or similar structure. The inner surfaces 34, 34' of the pair of elongated body member portions 28 extend longitudinally towards the first end 30 thereof, terminating in a generally annular wall 42. Each of the preferably arcuate outersurfaces 48, 48' of the pair of elongated body member portions 28, 28' further comprises a recessed portion such as 44, 44' immediatly adjacent first surface 24 of head member 22, the pair of recessed portions 44, 44' in cooperation with the adjacent annular wall segments 42 defining a generally reduced diameter section adapted to be retained in close fitting relationship within a selectively predetermined aperture or mounting hole in a panel such as 56, as illustrated more clearly in FIG. 2. Each of the recessed portions 44, 44' of elongated body members 28, 28' communicates with a respective outer surface 48, 48', thereof to form an upstanding wall 46, 46' therebetween providing a locking shoulder serving to securely retain mounting stud 20 within the aperture in panel 56 in generally normal axial alignment with the plane thereof. It will be understood that although each of the elongated body member portions 28, 28' is illustrated in FIG. 1 as comprising only two transverse recessed portions 36 and 38 and 36' and 38', respectively, disposed along the inner surfaces 34, 34' thereof, a plurality of such recesses may be provided therein to increase the number of available transverse passages formed by each pair of opposing complementary recesses without departing from the spirit of the invention. To more clearly illustrate the manner of use of mounting stud 20, and particularly with reference to FIG. 2, the tapered portions 40, 40' of interconnecting portion 32 of body member 26 are initially positioned adjacent a dimensionally restrictive aperture in a panel such as 56. Pressure is then applied to the head member 22 in longitudinal alignment with body member 26 of mounting stud 20, causing the tapered surfaces 40, 40' of interconnecting portion 32 to intimately contact the wall defining the restrictive aperture. As the outer surfaces 48, 48' of the elongated resilient body member portions 28, 28' contact the adjacent wall portions of the restrictive aperture, the lateral forces thereby exerted on resilient portions 28, 28' cause said portions 28, 28' to be compressively urged together, permitting body member 26 to be further advanced through the aperture, until restrained by the contact of the first surface 24 of the mounting stud head member 22 with the adjacent portion of the surface 58 of panel 56. As the upstanding walls 46, 46' of body member 26 clear the front surface 60 of panel 56, the resilient elongated body member portions 28, 28' return to their initial position, causing upstanding walls 46, 46' to abut adjacent surfaces of panel 56, providing a locking means to prevent the withdrawal of body member 26 therefrom. Mounting stud 20 is thus effectively assembled to panel 56 and disposed in proper position to readily accommodate the receipt of an elongated member such as strap 54. The presence of strap 54 within the passage formed by opposing complementary recessed portions 36, 36' of body member 26, as illustrated in FIG. 2, tends to maintain the pair of elongated body member portions 28, 28' in spaced apart relationship, the width W of strap 54 being proportioned to fit closely within the aforementioned passage in body member 26, thereby providing an additional locking feature securing mounting stud 20 to panel 56 by preventing the unintentional compression of resilient elongated portions 28, 28' while strap 54 is engaged therein. Where space behind a mounting panel such as 56 is limited, the relatively flat, button-like structure of head member 22 provides an additional advantageous feature, extending minimally beyond the rear surface 58 of panel 56, yet serving as a secure mounting means. It should be understood that although head member 22 is disclosed as having a relatively flat inner surface 24, surface 24 may be ridged, ribbed, knurled, or otherwise interrupted in other similar fashion without departing from the spirit of the invention. Additionally, the peripheral configuration of head member 22 is not intended to be limited to the generally circular shape illustrated, but may have other preferred configurations such as square, rectangular, or triangular without departing from the spirit of the invention.

Figure 4:
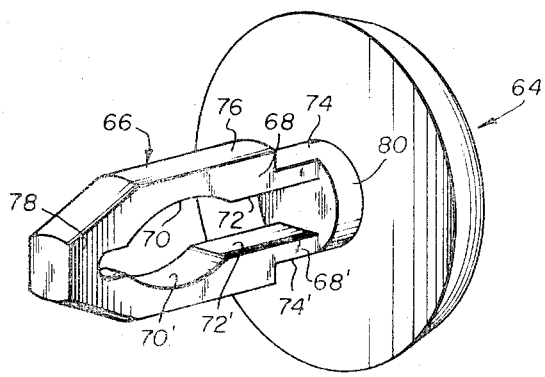
FIG. 4 is a perspective view of a mounting stud constructed in accordance with a further embodiment of the invention.

Turning now to FIG. 4, there is shown a further embodiment of a body member 66 of a mounting stud 62 constructed in accordance with the concepts of the invention. Body member 66 is coupled to and extends generally outwardly from head member 64 in a manner similar to that described above with respect to mounting stud 20. Each of the inner surfaces 72, 72' of a pair of elongated resilient body member portions 68, 68' comprising body member 66 is appropriately recessed as at 70 and 70' so as to define a generally annular segment, the pair of recesses 70, 70' being disposed in opposing complementary relationship to form a substantially annular passage therebetween for the receipt therethrough of a generally elongated tubular or cylindrical member. Other structural features of body member 66 and head member 64 duplicate similar elements as described above with reference to mounting stud 20, and the various modifications described with respect thereto are similarly applicable to mounting stud 62.

The embodiments of the invention in which an exclusive property or privileged is claimed are defined as follows:

1. Apparatus for mounting an article to a panel or similar structure, comprising: a mounting stud having a head member and a body member coupled thereto at a first end of said body member and extending outwardly therefrom generally normal to the plane thereof; said body member comprising a pair of generally resilient, spaced apart, elongated portions compressible inwardly normal to the longitudinal axis thereof, and an interconnecting portion integral therewith and connecting said elongated portions together adjacent the end of each remote from said head member, the inner surface of each of said pair of elongated portions being provided with at least one transverse recess axially disposed substantially normal to the longitudinal axis of said associated elongated portion, said transverse recess in the other of said pair of elongated portions, said opposing recesses at least partially defining a strap receiving passage and a strap member having a body portion extending through said strap receiving passage and supported therewithin, said strap member being adapted for restrictive engagement about an article to be secured to said mounting stud.

2. An apparatus as defined in claim 1 wherein said transverse recess in the inner surface of said elongated portion is generally arcuate.

3. An apparatus as defined in claim 1 wherein said inner surface of each of said elongated portions is provided with two transverse recesses in adjacent spaced apart relationship.

4. An apparatus as defined in claim 1 wherein said transverse recess is disposed generally intermediate the length of said body member.

5. An apparatus as defined in claim 1 wherein the outer surface of each of said pair of elongated portions of said body member adjacent said first end thereof is recessed, the width between said recessed outer surfaces of said pair of elongated portions being proportioned to fit closely within a selectively predetermined aperture in a panel or similar structure.

6. An apparatus as defined in claim 1 wherein said body member is formed integral with said head member.

7. An apparatus as defined in claim 1 wherein the outer surface of said interconnecting portion adjacent said elongated portions of said body member is tapered to facilitate the insertion of said body member within a dimensionally restrictive aperture.

8. An apparatus as defined in claim 1 wherein said head member is generally circular.

9. An apparatus as defined in claim 5 wherein the outer surface of said interconnecting portion adjacent said elongated portions of said body member is tapered.

10. An apparatus as defined in claim 3 wherein the outer surface of each of said pair of elongated portions of said body member adjacent said first end thereof is recessed, the width between said recessed outer surfaces of said pair of elongated portions being proportioned to fit closely within a selectively predetermined aperture in a panel or similar structure.

11. An apparatus as defined in claim 1 wherein said strap member body portion is proportioned to fit closely within said strap receiving passage to restrict the axial rotation of said body portion therewithin.

References Cited

UNITED STATES PATENTS

| | | | |
|---|---|---|---|
| 2,909,957 | 10/1959 | Rapata | 85—5 R |
| 3,529,795 | 9/1970 | Van Niel | 248—71 |

RAMON S. BRITTS, Primary Examiner

U.S. Cl. X.R.

24—213 R